(12) United States Patent
Meguro et al.

(10) Patent No.: US 7,960,045 B2
(45) Date of Patent: Jun. 14, 2011

(54) MAGNETIC RECORDING MEDIUM AND METHOD OF MANUFACTURING THE SAME

(75) Inventors: Katsuhiko Meguro, Kanagawa (JP); Masatoshi Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 102 days.

(21) Appl. No.: 12/239,937

(22) Filed: Sep. 29, 2008

(65) Prior Publication Data
US 2009/0087686 A1 Apr. 2, 2009

(30) Foreign Application Priority Data
Sep. 28, 2007 (JP) ................................. 2007-256665

(51) Int. Cl.
G11B 5/62 (2006.01)
B05D 5/12 (2006.01)
C08F 2/46 (2006.01)

(52) U.S. Cl. .................. 428/847.3; 428/847.8; 428/500; 528/290

(58) Field of Classification Search .................. 428/848, 428/842.8, 693, 425.9, 840, 846, 32.17, 838, 428/847, 847.1, 847.2, 847.3, 847.5, 847.8, 428/500; 427/127; 206/752; 528/290, 296; 360/134

See application file for complete search history.

(56) References Cited

U.S. PATENT DOCUMENTS

| | | | |
|---|---|---|---|
| 3,650,828 A * | 3/1972 | Higashi et al. ............. | 428/425.9 |
| 4,169,912 A * | 10/1979 | Schonafinger et al. ....... | 428/145 |
| 5,419,943 A | 5/1995 | Meguro et al. | |
| 7,022,385 B1 * | 4/2006 | Nasser ........................ | 428/32.17 |
| 2003/0004221 A1 * | 1/2003 | Sakurai et al. ............... | 428/500 |
| 2003/0022021 A1 * | 1/2003 | Kakuishi et al. .............. | 428/840 |
| 2003/0224213 A1 * | 12/2003 | Meguro et al. ............... | 428/848 |
| 2004/0191570 A1 * | 9/2004 | Edwards et al. .............. | 428/693 |
| 2004/0234816 A1 * | 11/2004 | Azakami et al. ............. | 428/846 |
| 2004/0254332 A1 * | 12/2004 | Hayes .......................... | 528/296 |
| 2005/0202288 A1 * | 9/2005 | Meguro et al. ............. | 428/842.8 |
| 2006/0289335 A1 * | 12/2006 | Kakuishi et al. ............. | 206/752 |
| 2007/0166571 A1 | 7/2007 | Meguro et al. | |

FOREIGN PATENT DOCUMENTS

| | | |
|---|---|---|
| JP | 06-150290 A | 5/1994 |
| JP | 11-110735 A | 4/1999 |
| JP | 2001-254008 A | 9/2001 |
| JP | 2005-346865 A | 12/2005 |
| JP | 2007-188613 A | 7/2007 |

OTHER PUBLICATIONS

Translation JP 11-110735 (Apr. 23, 1999).*
Translation JP 2007-188613 (Jul. 26, 2007).*

* cited by examiner

*Primary Examiner* — Kevin M. Bernatz
*Assistant Examiner* — Louis Falasco
(74) *Attorney, Agent, or Firm* — Sughrue Mion, PLLC

(57) ABSTRACT

An aspect of the present invention relates to a magnetic recording medium comprising a coating layer on a nonmagnetic support, wherein the coating layer comprises a nonmagnetic layer comprising a nonmagnetic powder and a binder and a magnetic layer comprising a ferromagnetic powder and a binder in this order, the nonmagnetic support comprises a main component in the form of a resin obtained by mixing and/or copolymerizing a polyester and a polymer having compatibility with the polyester, has a glass transition temperature of equal to or higher than 80° C. but less than 125° C., and has a heat absorption peak, based on enthalpy relaxation, ranging from 0.5 to 2.0 J/g. Another aspect of the present invention relates to a method of manufacturing a magnetic recording medium.

7 Claims, 2 Drawing Sheets

MAGNETIC RECORDING MEDIUM AND
METHOD OF MANUFACTURING THE SAME

CROSS-REFERENCE TO RELATED
APPLICATIONS

This application claims the benefit of priority under 35 USC 119 to Japanese Patent Application No. 2007-256665 filed on Sep. 28, 2007, which is expressly incorporated herein by reference in its entirety.

BACKGROUND OF THE INVENTION

1. Field of the Invention

The present invention relates to a magnetic recording medium and a method of manufacturing the same, and more particularly, to a magnetic recording medium with good dimensional stability, and to a method capable of stably manufacturing a magnetic recording medium of good dimensional stability.

2. Discussion of the Background

With the widespread use of personal computers, work stations, and the like in recent years, a large amount of research has been conducted in the field of magnetic tapes into magnetic recording media for use in recording computer data as external recording media. In the course of putting such magnetic recording media to practical use, a strong need has developed for greater recording capacity to achieve recording devices of greater capacity and smaller size. This has been particularly true in conjunction with reducing computer size and increasing information processing capability.

There has been a tendency to narrow the recording and reproduction track widths of magnetic recording media to achieve higher recording density and greater recording capacity. The thinning of magnetic tapes to permit high density recording has progressed in the field of magnetic tapes, with numerous magnetic tapes with a total thickness of 10 micrometers or less having appeared. However, as the thickness of a magnetic recording medium is reduced, it tends to be affected by changes in tension, heat, and humidity during storage, running, and the like.

That is, during recording and reproduction in magnetic recording and reproduction systems employing linear recording methods, the head moves in the width direction of the magnetic tape to select a track. As the track width becomes narrow, high precision becomes necessary to control the position of the head relative to the magnetic tape. Even when a narrow track is realized, variation in temperature and humidity in the use environment and in tension within the drive may distort the magnetic recording medium, in some cases precluding the reproduction head from reading tracks that have been recorded. Thus, there is a need for a magnetic recording medium affording better dimensional stability than what has been achieved thus far. To maintain stable recording and reproduction in such a high-density magnetic recording medium, greater dimensional stability is needed than that afforded by conventional media.

Accordingly, it has been proposed that the heat absorption level based on enthalpy relaxation be kept below a prescribed level due to noncrystalline portions (amorphous portions) by conducting a heat treatment at a temperature at or below the glass transition temperature of the nonmagnetic support (for example, see Japanese Unexamined Patent Publication (KOKAI) Heisei No. 11-110735, Japanese Unexamined Patent Publication (KOKAI) No. 2007-188613 or English language family member US 2007/166571 A1, which are expressly incorporated herein by reference in their entirety).

Japanese Unexamined Patent Publication (KOKAI) Heisei No. 11-110735 describes relaxing enthalpy by subjecting a polyethylene terephthalate support with a glass transition temperature Tg of 70° C. to a heat treatment at 60° C. However, by the method described in this application, even when it is possible to relax enthalpy and achieve dimensional stability in the support, it is impossible to obtain a support having adequate strength due to the low glass transition temperature of the support. Japanese Unexamined Patent Publication (KOKAI) No. 2007-188613 describes relaxing enthalpy by subjecting a polyethylene terephthalate support with a glass transition temperature of 125° C. to a heat treatment at 110° C. However, investigation by the present inventors has revealed that it is sometimes difficult to stably produce a magnetic recording medium by the technique described in this application due to sticking of the tape when the heat treatment step to relax enthalpy is conducted with the stock material of the magnetic recording medium in a rolled-up state following formation of the magnetic layer.

SUMMARY OF THE INVENTION

An aspect of the present invention provides for a magnetic recording medium with good dimensional stability, and to provide a means for stably manufacturing a magnetic recording medium with good dimensional stability.

Various films, such as polyester film, polyolefin film, cellulose triacetate, polyamide, polyimide, polyamideimide, polysulfone, aromatic polyamides, and polybenzoxazole can be employed as the support film of the magnetic recording medium. Of these, polyester is widely employed as a nonmagnetic support because it affords high strength, is readily synthesized, and has good resistance to the solvents employed in the manufacturing of magnetic recording media. However, the glass transition temperature of the polyester film described in Japanese Unexamined Patent Publication (KOKAI) No. 2007-188613 is 125° C. being high, so the heat treatment temperature (lower than or equal to the glass transition temperature of the support) for relaxing enthalpy ends up being in the vicinity of the glass transition temperature of ordinary magnetic layers. Thus, there is a problem in that when the heat treatment is conducted with the stock material of the magnetic recording medium in a rolled-up state, the magnetic layer becomes tacky and layers within the roll stick together. When viewed solely in terms of glass transition temperature, polyvinyl chloride and polystyrene have glass transition temperatures of around 100° C. and present the possibility of not sticking during heat treatment to relax enthalpy. However, polyvinyl chloride and polystyrene are soluble in the ketone-based solvents that are widely employed in the manufacturing of magnetic recording media, so their application to magnetic recording media is difficult. Further, while it is also conceivable to raise the glass transition temperature of the magnetic layer to prevent sticking, the higher the glass transition temperature of the magnetic layer is raised, the greater the reduction in calender moldability, making it difficult to obtain a magnetic layer with good surface properties.

Accordingly, the present inventors conducted extensive research, resulting in the discovery that by employing a suitable blend (mixture and/or copolymer) of a polyester resin and a compatible polymer as the support of a magnetic recording medium, it was possible to lower the glass transition temperature while retaining the advantages of the polyester resin, and thus solve the above-stated problems. The present invention was devised on that basis.

An aspect of the present invention relates to a magnetic recording medium comprising a coating layer on a nonmagnetic support, wherein the coating layer comprises a nonmagnetic layer comprising a nonmagnetic powder and a binder and a magnetic layer comprising a ferromagnetic powder and a binder in this order, the nonmagnetic support comprises a main component in the form of a resin obtained by mixing and/or copolymerizing a polyester and a polymer having compatibility with the polyester, has a glass transition temperature of equal to or higher than 80° C. but less than 125° C., and has a heat absorption peak, based on enthalpy relaxation, ranging from 0.5 to 2.0 J/g.

The coating layer may have a glass transition temperature ranging from 70 to 95° C.

A further aspect of the present invention relates to a method of manufacturing a magnetic recording medium, wherein the magnetic recording medium comprises a coating layer on a nonmagnetic support, the coating layer comprises a nonmagnetic layer comprising a nonmagnetic powder and a binder and a magnetic layer comprising a ferromagnetic powder and a binder in this order, the nonmagnetic support comprises a main component in the form of a resin obtained by mixing and/or copolymerizing a polyester and a polymer having compatibility with the polyester, has a glass transition temperature of equal to or higher than 80° C. but less than 125° C.; and the method comprising subjecting the magnetic recording medium following forming the coating layer to heat treatment to adjust a heat absorption peak of the nonmagnetic support, based on enthalpy relaxation, within a range of 0.5 to 2.0 J/g.

The heat treatment may be conducted at a temperature 5 to 30° C. lower than a glass transition temperature of the coating layer.

The coating layer may have a glass transition temperature ranging from 70 to 95° C.

The present invention can provide a magnetic recording medium with good dimensional stability. Furthermore, the present invention can provide an inexpensive magnetic recording medium of good reliability, in which breaking due to adhesion during processing tends not to occur, resulting in a high yield.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the figures, wherein.

DESCRIPTIONS OF THE EMBODIMENTS

Figure 1:
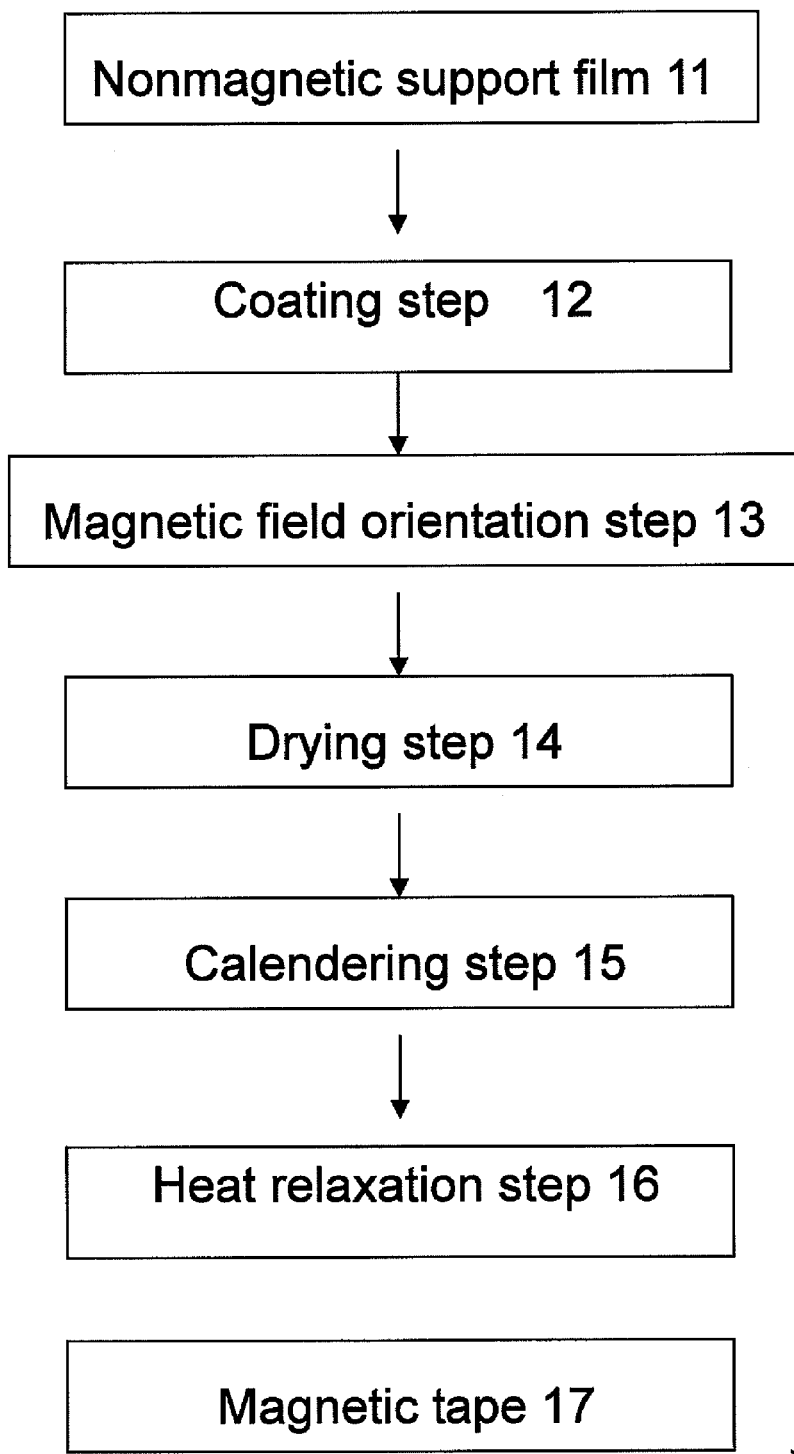
FIG. 1 is a diagram of the manufacturing process in an example of the method of manufacturing a magnetic recording medium of the present invention.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Magnetic Recording Medium

The magnetic recording medium of the present invention comprises a coating layer on a nonmagnetic support. The coating layer comprises a nonmagnetic layer comprising a nonmagnetic powder and a binder and a magnetic layer comprising a ferromagnetic powder and a binder in this order, the nonmagnetic support comprises a main component in the form of a resin obtained by mixing and/or copolymerizing a polyester and a polymer having compatibility with the polyester, has a glass transition temperature of equal to or higher than 80° C. but less than 125° C., and has a heat absorption peak, based on enthalpy relaxation, ranging from 0.5 to 2.0 J/g.

The magnetic recording medium of the present invention will be described in detail below.

Heat Absorption Peak Based on Enthalpy Relaxation

In the magnetic recording medium of the present invention, the heat absorption peak based on enthalpy relaxation of the nonmagnetic support ranges from 0.5 to 2.0 J/g. The "heat absorption peak" means the amount of heat absorption (also referred to as the amount of enthalpy relaxation ($\Delta H$), hereinafter) based on enthalpy relaxation due to the amorphous portion in the nonmagnetic support. Enthalpy relaxation due to the amorphous portion occurs for reasons such as the following. The amorphous portion of polymeric substances constituting the nonmagnetic support and the like is in a liquid state at and above the glass transition temperature. When such substances are rapidly cooled from a liquid state, enthalpy is reduced while maintaining a state of equilibrium down to the glass transition temperature. Then, when the temperature of these substances drops lower than the glass transition temperature, the amorphous portion that was previously in a liquid state undergoes a phase transition, and its viscosity increases markedly. Thus, the mobility of segments such as the polymeric substances constituting the amorphous portion diminishes. As a result, the decrease in enthalpy of the amorphous portion does not track the drop in temperature accompanying cooling, and the amorphous portion changes in a nonequilibrium state, with excess enthalpy relative to an equilibrium state. In the substances with this excess enthalpy, the amorphous portion gradually changes from a nonequilibrium state to an equilibrium glass state, releasing the excess enthalpy.

Accordingly, subjecting the nonmagnetic support to a heat treatment to relax enthalpy promotes the transition from a liquid state to an equilibrium glass state, rapidly achieving stabilization. Gradually raising the temperature of the substance in this state from lower than the glass transition temperature causes heat to be absorbed due to enthalpy relaxation in the amorphous portion at the glass transition temperature, with the amorphous portion of polymeric substances and the like undergoing a change in phase from an equilibrium glass state to a liquid state.

As is clear from the above description, in the enthalpy relaxation, there is a correlation between the amount of the reduction in enthalpy due to the amorphous portion changing from a nonequilibrium state to an equilibrium state, consequently, the extent of the above heat treatment: the greater the extent of the heat treatment, the greater the amount of enthalpy relaxation ($\Delta H$).

When the amount of enthalpy relaxation ($\Delta H$) is less than 0.5 J/g, the degree of nonequilibrium in the glass state increases and the dimensional stability of the nonmagnetic support becomes inadequate for use in a magnetic recording medium. When the amount of enthalpy relaxation (ΔH) exceeds 2.0 J/g, there are problems such as a reduction in the degree of heightened orientation achieved by drawing. The amount of enthalpy relaxation is preferably equal to or greater than 0.6 J/g and equal to or less than 1.8 J/g, more preferably equal to or greater than 0.7 J/g and equal to or less than 1.6 J/g. Details regarding the heat treatment that is used to achieve an amount of enthalpy relaxation falling within the above range are described below.

Nonmagnetic Support

In the magnetic recording medium of the present invention, the nonmagnetic support comprises a main component in the form of a resin obtained by mixing and/or copolymerizing a polyester and a polymer having compatibility with the polyester, and has a glass transition temperature of equal to or higher than 80° C. but less than 125° C. As set forth above, manufacturing a nonmagnetic support having a glass transition temperature of equal to or higher than 80° C. but less than 125° C. from a resin obtained by mixing and/or copolymerizing a polyester and a polymer having compatibility with the polyester can inhibit sticking of the medium during the heat treatment to relax enthalpy while retaining the advantages of the polyester.

As set forth above, sticking during the heat treatment to relax enthalpy may occur when the glass transition temperature of the nonmagnetic support is equal to or greater than 125° C. When an extremely high glass transition temperature is employed, breaking tends to occur during processing and the yield drops. Conversely, when the glass transition temperature is less than 80° C., the strength of the nonmagnetic support is inadequate, the time required to conduct the heat treatment to relax enthalpy increases, and productivity drops sharply. The glass transition temperature preferably ranges from 85 to 123° C., more preferably 90 to 120° C.

In the present invention, the term "glass transition temperature" refers to a value that is measured by the following method. The term "glass transition temperature of the coating layer" means the glass transition temperature of a coating layer present on the surface on the magnetic layer side of the nonmagnetic support. The coating layer is comprised of both a nonmagnetic layer and a magnetic layer when a nonmagnetic layer and a magnetic layer are present on a nonmagnetic support, and further includes an undercoating layer, when an undercoating layer is further included.

A Q100 temperature-modulation differential scanning calorimeter (TMDSC) made by TA Instruments is employed. The sample is uniformly introduced into an aluminum pan and clamped. The sample is then placed in the sample chamber and measurement is conducted from room temperature to 300° C. at a rate of temperature increase of 5° C./min, a temperature modulation period of 30 s, and a temperature modulation amplitude of 0.5° C. The midpoint of the difference in level of the temperature-reverse heat flow curve obtained is adopted as the glass transition temperature (Tg).

The nonmagnetic support comprises a main component in the form of a resin obtained by mixing and/or copolymerizing a polyester and a polymer having compatibility with the polyester. In this context, the term "a main component in the form of a resin" means that the resin constitutes equal to or more than 50 weight percent of the nonmagnetic support.

For example, the glass transition temperature of polyethylene naphthalate is 127° C. as measured by the above method. The glass transition temperature of a polyester such as polyethylene naphthalate can be lowered by blending (mixing or copolymerizing) a mutually compatible polymer that is of similar structure. For polyethylene naphthalate (a copolymer of naphthalene dicarboxylic acid and ethylene glycol), polymers that lower the glass transition temperature can be obtained, for example, by combining naphthalene dicarboxylic acid with different diols having long chains such as propylene glycol, tetramethylene glycol, and hexamethylene diglycol, or by mixing a compound having a hydroxyl group and a carboxyl group on a naphthalene ring, such as 6-hydroxy-2-naphthenoic acid, and hydroxybenzoic acid, 4-hydroxy-4'-carboxybiphenyl, or the like, either singly or in copolymer form. Reference can be made in Examples described further below for methods of synthesizing the resin.

As set forth further below, the heat treatment to relax enthalpy is conducted at a temperature lower than the glass transition temperature of the nonmagnetic support. The glass transition temperature of the nonmagnetic support is preferably 5 to 40° C. higher, more preferably 10 to 35° C. higher, than the glass transition temperature of the coating layer comprising the nonmagnetic layer and magnetic layer. This is so that the temperature of the heat treatment for relaxing enthalpy does not approach the glass transition temperature of the coating layer. The glass transition temperature of the coating layer preferably ranges from 70 to 95° C., more preferably 75 to 90° C., and further preferably, 80 to 90° C. When the glass transition temperature falls within the above range, the heat treatment to relax enthalpy tends not to cause softening, calender molding properties can be good, and protrusions on the backcoat layer tend not to be transferred during application of the heat treatment to rolls.

The magnetic recording medium of the present invention will be described in greater detail below.

I. Nonmagnetic Support

Details relating to the resin constituting the nonmagnetic support are as set forth above. The method of manufacturing the nonmagnetic support is not specifically limited, but a method permitting adjustment of the mechanical strength in the longitudinal and width directions is desirable. Specifically, when forming (manufacturing) a film of the above-described resin, a method of suitably drawing the resin in the longitudinal and width directions is desirably employed. The Young's modulus of the support employed in the present invention is preferably 4.4 to 15 GPa, more preferably 5.5 to 11 GPa, in both the longitudinal and width directions. The Young's modulus may differ in the longitudinal and width directions. An undrawn film can be biaxially drawn to impart a biaxial orientation to adjust the mechanical strength in the longitudinal and width directions. Successive biaxial drawing methods and simultaneous biaxial drawing methods may be employed as the drawing method. By way of preferable example, a successive biaxial drawing method by which drawing is first conducted in the longitudinal direction and then in the width direction can be employed. In the successive biaxial drawing method, the drawing in the longitudinal direction can be divided into three or more stages, the longitudinal drawing temperature can be 80 to 180° C., the total longitudinal drawing rate can be 3.0 to 6.0-fold, and the longitudinal drawing rate can range from 5,000 percent/minute to 50,000 percent/minute. A method employing a tenter is desirable as the drawing method in the width direction; the drawing temperature is desirably from the glass transition temperature (Tg) of the film to Tg+100° C., the drawing factor in the width direction is desirably 3.2 to 7.0-fold, sometimes larger than the drawing factor in the longitudinal direction, and the width direction drawing rate desirably ranges from 1,000 percent/min to 20,000 percent/min. Further, repeat longitudinal drawing and width drawing can be conducted as needed. Since drawing conditions such as the drawing factor and drawing temperature may greatly affect molecular orientation conditions, these conditions are desirably suitably selected to obtain a biaxially oriented film.

Next, the biaxially oriented film is desirably heat treated. The temperature of the heat treatment is suitably from the cold crystallization temperature (Tc)+40° C. to Tc+100° C., and the duration suitably falls within a range of 5 to 60 s. Since the glass transition temperature and amount of heat shrinkage may change based on these heat treatment conditions and based on the processing temperature conditions following the heat treatment in the course of returning to ordinary temperature, these conditions are desirably suitably selected.

By subjecting the biaxially oriented film thus obtained to a heat treatment in which suitable conditions are employed, the enthalpy of the nonmagnetic support can be relaxed and a nonmagnetic support with a desired level of enthalpy relaxation can be obtained. The temperature of the heat treatment is preferably 1 to 40° C. lower, more preferably 1 to 30° C. lower, and further preferably, 1 to 20° C. lower, than the glass transition temperature (Tg) of the material constituting the biaxially oriented film. To prevent sticking caused by adhesion of the coating layer, the temperature in the heat treatment is desirably made 5 to 30° C. lower than the glass transition of the coating layer. When the temperature of the heat treatment is too low, the heat treatment period becomes excessively long. Conversely, when the temperature of the heat treatment is higher than the glass transition temperature, main chain micro-Brownian motion increases excessively, precluding enthalpy relaxation.

The duration of the heat treatment is, for example, from 1 hour to 14 days, preferably from 5 hours to 7 days, and more preferably, from 10 to 50 hours. When the heat treatment lasts less than 1 hour, it is difficult to achieve the suitable effect of the heat treatment. A duration exceeding 14 days is undesirable in terms of productivity, with no further effect being achieved relative to shorter durations. Gradual cooling to room temperature is desirably conducted following the heat treatment.

The method used to conduct the heat treatment is not specifically limited. The heat treatment can be conducted with the biaxially oriented film unrolled from the roll, while it is still in a rolled up state, or any combination thereof. From the perspective of productivity, the heat treatment is desirably conducted with the film in a rolled-up state. As set forth above, sticking of the coating layer during heat treatment with the film in a rolled-up state can be prevented in the present invention.

The center surface average roughness (JIS B 0660-1998, ISO 4287-1997) on the side on which the magnetic layer is coated of a nonmagnetic support suited to use in the present invention is preferably equal to or greater than 1.8 nm and equal to or less than 9 nm, more preferably equal to or greater than 2 nm and equal to or less than 8 nm, with a cutoff value of 0.25 mm. The two surfaces of the support may be of different roughness. The thickness of the nonmagnetic support in the magnetic recording medium of the present invention is desirably equal to or greater than 3 micrometers and equal to or less than 60 micrometers. The nonmagnetic support can be subjected to corona discharge treatment, plasma treatment, adhesion-enhancing treatment, heat treatment, or the like.

II. Magnetic Material

<Ferromagnetic Metal Powder (Ferromagnetic Metal Micropowder)>

Ferromagnetic metal powder can be employed as the ferromagnetic powder. Ferromagnetic metal powder is known to afford good high-density magnetic recording characteristics. Ferromagnetic metal powder can be used to obtain a magnetic recording medium with good electromagnetic characteristics. The average axis length ("average major axis length" hereinafter) of the ferromagnetic metal powder employed in the magnetic layer of the magnetic recording medium of the present invention is, for example, equal to or greater than 20 nm and equal to or less than 60 nm, preferably equal to or greater than 25 nm and equal to or less than 50 nm, and more preferably, equal to or greater than 30 nm and equal to or less than 45 nm. Ferromagnetic metal powder with an average major axis length of equal to or greater than 20 nm can effectively suppress a drop in magnetic characteristics due to thermal fluctuation. An average major axis length of equal to or less than 60 nm makes it possible to achieve a good S/N ratio while maintaining low noise.

The average axial diameter (=average major axis length) of the ferromagnetic metal powder can be obtained by photographing the ferromagnetic metal powder by transmission electron microscopy and calculating the average of values obtained by combining the method of directly reading the minor axis diameter and major axis diameter of the ferromagnetic metal powder from the photographs with the method of reading by tracing the transmission electron microscope photographs with an IBASS I image analyzer made by Carl Zeiss.

The ferromagnetic metal powder employed in the magnetic layer is not specifically limited so long as it is comprised primarily of Fe, and preferably a ferromagnetic alloy power comprised primarily of α-Fe. In addition to prescribed atoms, the following atoms can be contained in the ferromagnetic metal powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. Particularly, incorporation of at least one of the following in addition to α-Fe is desirable: Al, Si, Ca, Y, Ba, La, Nd, Co, Ni, and B. Incorporation of at least one selected from the group consisting of Co, Al and Y is particularly preferred. The Co content preferably ranges from 10 to 40 atom percent with respect to Fe. The Al content preferably ranges from 2 to 20 atom percent with respect to Fe. The content of Y preferably ranges from 1 to 15 atom percent with respect to Fe.

These ferromagnetic metal powders may be pretreated prior to dispersion with dispersing agents, lubricants, surfactants, antistatic agents, and the like, described further below. The ferromagnetic metal powder may contain a small quantity of moisture, hydroxide or oxide. The moisture content of the ferromagnetic metal powder is desirably 0.01 to 2 percent. The moisture content of the ferromagnetic metal powder is desirably optimized based on the type of binder. The pH of the ferromagnetic metal powder is desirably optimized depending on what is combined with the binder. A range of 6 to 12 can be established, with 7 to 11 being preferred. The ferromagnetic metal powder sometimes contains inorganic ions such as soluble Na, Ca, Fe, Ni, Sr, $NH_4$, $SO_4$, Cl, $NO_2$, $NO_3$ or the like. These are desirably substantially not present, but seldom affect characteristics at a total content of inorganic ions of equal to or less than 300 ppm. The ferromagnetic metal powder employed in the present invention desirably has few voids; the level is preferably equal to or less than 20 volume percent, more preferably equal to or less than 5 volume percent.

The crystallite size of the ferromagnetic metal powder is, for example, equal to or greater than 8 nm and equal to or less than 20 nm, preferably equal to or greater than 10 nm and equal to or less than 18 nm, and more preferably, equal to or greater than 12 nm and equal to or less than 16 nm. The crystallite size is an average value obtained by the method of Scherrer from the half-width of the diffraction peak under conditions of a radiation source of CuKα1, a tube voltage of 50 kV, and a tube current of 300 mA using an X-ray diffraction device (Rigaku RINT 2000 series).

The specific surface area by BET method of the ferromagnetic metal powder employed in the magnetic layer is preferably equal to or greater than 30 m$^2$/g and less than 50 m$^2$/g, more preferably 38 to 48 m$^2$/g. Both good surface property and low noise can be achieved within the above range. As needed, the ferromagnetic metal powder can be surface treated with Al, Si, P, or an oxide thereof. The quantity can be set to 0.1 to 10 weight percent of the ferromagnetic metal powder. When applying a surface treatment, the quantity of a lubricant such as a fatty acid that is adsorbed is desirably not greater than 100 mg/m$^2$.

So long as the above-described particle size characteristics are satisfied, the ferromagnetic metal powder may be acicular, granular, or plate-shaped, with acicular ferromagnetic metal powder being preferred. The acicular ratio of the acicular ferromagnetic metal powder preferably ranges from 4 to 12, more preferably 5 to 12. The coercivity Hc of the ferromagnetic metal powder preferably ranges from 159.2 kA/m to 238.8 kA/m, more preferably 167.2 kA/m to 230.8 kA/m. The saturation magnetic flux density preferably ranges from 150T·m to 300T·m, more preferably 160T·m to 290T·m. The saturation magnetization as preferably ranges from 140 A·m$^2$/kg to 170 A·m$^2$/kg, more preferably 145 A·m$^2$/kg to 160 A·m$^2$/kg.

A ferromagnetic metal powder with a low switching field distribution (SFD) is desirable, with equal to or less than 0.8 being preferred. A SFD of equal to or less than 0.8 affords good electromagnetic characteristics, high output, sharp magnetic reversal, and little peak shift, which is suited to high-density digital magnetic recording. Methods of achieving a low Hc distribution include improving the particle size distribution of goethite in the ferromagnetic metal powder, employing monodisperse α-Fe$_2$O$_3$, and preventing sintering of particles, and the like.

The ferromagnetic metal powder that is employed may be obtained by known manufacturing methods, examples of which are: reducing iron oxide or water-containing iron oxide that has been treated to prevent sintering with a reducing gas such as hydrogen to obtain Fe or Fe—Co particles; reducing a compound organic acid salt (chiefly a salt of oxalic acid) with a reducing gas such as hydrogen; thermally decomposing a metal carbonyl compound; reduction by adding a reducing agent such as sodium boron hydride, hypophosphite, or hydrazine to the aqueous solution of a ferromagnetic metal; and evaporating a metal in an inert gas at low pressure to obtain micropowder. The ferromagnetic metal powder thus obtained is desirably subjected to a known slow oxidation treatment. The method of reducing iron oxide or water-containing iron oxide with a reducing gas such as hydrogen and controlling the time, temperature, and partial pressure of oxygen-containing gas and inert gas to form an oxide film on the surface is preferred due to low demagnetization.

<Ferromagnetic Hexagonal Ferrite Powder>

Ferromagnetic hexagonal ferrite powder can be employed as the ferromagnetic powder. Ferromagnetic hexagonal ferrite powder has a hexagonal magnetoplumbite structure, extremely high single-axis crystal magnetic anisotropy, and extremely high coercivity (Hc). Thus, a magnetic recording medium in which ferromagnetic hexagonal ferrite powder is employed can exhibit good chemical stability, corrosion resistance, and abrasion resistance; permit a reduction in magnetic spacing at higher densities and the realization of thinner films; and afford a high C/N ratio and resolution. The average plate diameter of ferromagnetic hexagonal ferrite powder is preferably equal to or greater than 5 nm and equal to or less than 40 nm, more preferably equal to or greater than 10 nm and equal to or less than 38 nm, and further preferably, equal to or greater than 15 nm and equal to or less than 36 nm.

Generally, when the track density is increased and reproduction is conducted with a magnetoresistive head, it is necessary to keep the noise low and employ ferromagnetic hexagonal ferrite powder with a small average plate diameter. From the perspective of decreasing the magnetic spacing, it is desirable to employ hexagonal ferrite with as small a plate diameter as possible. However, when ferromagnetic hexagonal ferrite of excessively small average plate diameter is employed, magnetization is rendered unstable due to thermal fluctuation. Thus, the average plate diameter of the ferromagnetic hexagonal ferrite powder employed in the magnetic layer of the magnetic recording medium of the present invention is desirably equal to or greater than 5 nm. When the average plate diameter is equal to or greater than 5 nm, there is little effect due to thermal fluctuation and stable magnetization can be achieved. Additionally, the average plate diameter of the ferromagnetic hexagonal ferrite powder is desirably equal to or less than 40 nm. When the average plate diameter is equal to or less than 40 nm, it is possible to inhibit the drop in electromagnetic characteristics caused by increased noise, and reproduction with a magnetoresistive head (MR) is possible. The average plate diameter of ferromagnetic hexagonal ferrite powder can be obtained by photographing the ferromagnetic hexagonal powder by transmission electron microscopy and calculating the average of values obtained by measurement combining the method of directly reading the plate diameter of the ferromagnetic hexagonal ferrite powder from the photographs with the method of reading by tracing the transmission electron microscope photographs with an IBASS I image analyzer made by Carl Zeiss.

Examples of hexagonal ferrite ferromagnetic powders comprised in the magnetic layer are various substitution products of barium ferrite, strontium ferrite, lead ferrite, and calcium ferrite, and Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods.

The particle size of the ferromagnetic hexagonal ferrite powder is, as an average plate diameter as mentioned above, preferably 5 to 40 nm, more preferably 10 to 38 nm, further preferably 15 to 36 nm. The average plate thickness is preferably 1 to 30 nm, more preferably 2 to 25 nm, further preferably 3 to 20 nm. The plate ratio (plate diameter/plate thickness) is preferably 1 to 15, more preferably 1 to 7. When the plate ratio is within a range of 1 to 15, it is possible to achieve adequate orientation properties while maintaining a high filling property in the magnetic layer, as well as to prevent noise increase due to stacking between particles. In addition, the specific surface area by BET method within the above-mentioned particle size may be 10 to 200 m²/g, almost corresponding to an arithmetic value from the particle plate diameter and the plate thickness.

For the ferromagnetic hexagonal ferrite particle, narrow distributions of particle plate diameter and plate thickness are normally preferred. Although difficult to render in number form, 500 particles can be randomly measured in a TEM photograph of particles to make a comparison. The distributions of the particle plate diameter and plate thickness are often not a normal distribution. However, when expressed as the standard deviation to the average size, a/average size=0.1 to 2.0. The particle producing reaction system is rendered as uniform as possible and the particles produced are subjected to a distribution-enhancing treatment to achieve a sharp particle size distribution. For example, methods such as selectively dissolving ultrafine particles in an acid solution by dissolution are known.

The coercivity (Hc) of the hexagonal ferrite particle can be 159.2 to 238.8 kA/m, preferably 175.1 to 222.9 kA/m, more preferably 183.1 to 214.9 kA/m. However, when the saturation magnetization (σs) of the head exceeds 1.4 T, 159.2 kA/m or more is preferred. The coercivity (Hc) can be controlled by particle size (plate diameter and plate thickness), the types and quantities of elements contained, substitution sites of the element, the particle producing reaction conditions, and the like.

The saturation magnetization (σs) of the hexagonal ferrite particle is preferably 40 to 80 A·m²/kg. The higher saturation magnetization (σs) is preferred, however, it tends to decrease with decreasing particle size. Known methods of improving saturation magnetization (σs) are combining spinel ferrite with magnetoplumbite ferrite, selection of the type and quantity of elements incorporated, and the like. It is also possible to employ W-type hexagonal ferrite. When dispersing the magnetic material, the surface of the magnetic material particles can be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added ranges from, for example, 0.1 to 10 weight percent relative to the weight of the magnetic material. The pH of the magnetic material is also important to dispersion. A pH of about 4 to 12 is usually optimum for the dispersion medium and polymer. From the perspective of the chemical stability and storage properties of the medium, a pH of about 6 to 11 can be selected. Moisture contained in the magnetic material also affects dispersion. There is an optimum level for the dispersion medium and polymer, usually selected from the range of 0.01 to 2.0 percent.

Methods of manufacturing the ferromagnetic hexagonal ferrite powder include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. However, any manufacturing method can be selected in the present invention. The ferromagnetic hexagonal ferrite powder may be surface treated as necessary with Al, Si, P, an oxide thereof, or the like. The quantity employed desirably ranges from 0.1 to 10 percent of the ferromagnetic powder, and when a surface treatment is conducted, a lubricant such as a fatty acid is desirably adsorbed in a quantity of equal to or less than 100 mg/m². An inorganic ion in the form of soluble Na, Ca, Fe, Ni, Sr, or the like may be contained in the ferromagnetic powder. These are preferably substantially not contained, but at levels of equal to or less than 200 ppm, characteristics are seldom affected.

III. Nonmagnetic Powder

The magnetic recording medium of the present invention comprises a nonmagnetic layer comprising a nonmagnetic powder and a binder. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides.

Specifically, titanium oxides such as titanium dioxide, cerium oxide, tin oxide, tungsten oxide, ZnO, $ZrO_2$, $SiO_2$, $Cr_2O_3$, α-alumina with an a-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped. The crystallite size of the nonmagnetic powder desirably ranges from 4 nm to 1 micrometer, preferably from 40 to 100 nm. A crystallite size falling within a range of 4 nm to 1 micrometer is desirable in that it facilitates dispersion and imparts a suitable surface roughness. The average particle diameter of the nonmagnetic powder desirably ranges from 5 nm to 2 micrometers. As needed, nonmagnetic powders of differing average particle diameter may be combined; the same effect may be achieved by broadening the average particle distribution of a single nonmagnetic powder. The preferred average particle diameter of the nonmagnetic powder ranges from 10 to 200 nm. Within a range of 5 nm to 2 micrometers, dispersion is good and good surface roughness is achieved.

The specific surface area of the nonmagnetic powder desirably ranges from 1 to 100 m²/g, preferably from 5 to 70 m²/g, and more preferably from 10 to 65 m²/g. Within the specific surface area ranging from 1 to 100 m²/g, suitable surface roughness is achieved and dispersion is possible with the desired quantity of binder. Oil absorption capacity using dibutyl phthalate (DBP) desirably ranges from 5 to 100 mL/100 g, preferably from 10 to 80 mL/100 g, and more preferably from 20 to 60 mL/100 g. The specific gravity desirably ranges from 1 to 12, preferably from 3 to 6. The tap density desirably ranges from 0.05 to 2 g/mL, preferably from 0.2 to 1.5 g/mL. A tap density falling within a range of 0.05 to 2 g/mL can reduce the amount of scattering particles, thereby facilitating handling, and tends to prevent solidification to the device. The pH of the nonmagnetic powder desirably ranges from 2 to 11, preferably from 6 to 9. When the pH falls within a range of 2 to 11, the coefficient of friction may not become high at high temperature or high humidity or due to the freeing of fatty acids. The moisture content of the nonmagnetic powder desirably ranges from 0.1 to 5 weight percent, preferably from 0.2 to 3 weight percent, and more preferably from 0.3 to 1.5 weight percent. A moisture content falling within a range of 0.1 to 5 weight percent is desirable because it can produce good dispersion and yield a stable coating viscosity following dispersion. An ignition loss of equal to or less than 20 weight percent is desirable and nonmagnetic powders with low ignition losses are desirable.

When the nonmagnetic powder is an inorganic powder, the Mohs' hardness is preferably 4 to 10. Durability can be ensured if the Mohs' hardness ranges from 4 to 10. The stearic acid (SA) adsorption capacity of the nonmagnetic powder preferably ranges from 1 to 20 micromol/m$^2$, more preferably from 2 to 15 micromol/m$^2$. The heat of wetting in 25° C. water of the nonmagnetic powder is preferably within a range of 200 to 600 erg/cm$^2$. A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9. The surface of these nonmagnetic powders is preferably treated with $Al_2O_3$, $SiO_2$, $TiO_2$, $ZrO_2$, $SnO_2$, $Sb_2O_3$, and ZnO. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. They may be employed singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the nonmagnetic layer in the present invention are: Nanotite from Showa Denko K. K.; HIT-100 and ZA-G1 from Sumitomo Chemical Co., Ltd.; DPN-250, DPN-250BX, DPN-245, DPN-270BX, DPN-550BX and DPN-550RX from Toda Kogyo Corp.; titanium oxide TTO-51B, TTO-55A, TTO-55B, TTO-55C, TTO-55S, TTO-55D, SN-100, MJ-7, α-iron oxide E270, E271 and E300 from Ishihara Sangyo Co., Ltd.; STT-4D, STT-30D, STT-30 and STT-65C from Titan Kogyo K. K.; MT-100S, MT-100T, MT-150W, MT-500B, MT-600B, MT-100F and MT-500HD from Tayca Corporation; FINEX-25, BF-1, BF-10, BF-20 and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; Y-LOP from Titan Kogyo K. K.; and sintered products of the same. Particular preferable nonmagnetic powders are titanium dioxide and α-iron oxide.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed.

IV. Binder

Conventionally known thermoplastic resins, thermosetting resins, reactive resins and mixtures thereof may be employed as binders employed in the magnetic layer and nonmagnetic layer in the present invention. Examples of the thermoplastic resins are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins.

Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. The thermoplastic resins, the thermosetting resins and the reactive resins are described in detail in the Handbook of Plastics published by Asakura Shoten, which is expressly incorporated herein by reference in its entirety.

Further, when an electron beam-curable resin is employed in the magnetic layer, not only coating strength can be improved to improve durability, but also the surface is rendered smooth to enhance electromagnetic characteristics.

The above-described resins may be employed singly or in combination. Of these, the use of polyurethane resin is preferred. In particular, the use of the following polyurethane resin is further preferred; a polyurethane resin prepared by reacting a cyclic compound such as hydrogenated bisphenol A or a polypropylene oxide adduct of hydrogenated bisphenol A, a polyol with a molecular weight of 500 to 5,000 comprising an alkylene oxide chain, a chain-extending agent in the form of a polyol with a molecular weight of 200 to 500 having a cyclic structure, and an organic diisocyanate, as well as introducing a hydrophilic polar group; a polyurethane resin prepared by reacting an aliphatic dibasic acid such as succinic acid, adipic acid, or sebacic acid, a polyester polyol comprised of an aliphatic diol not having a cyclic structure having an alkyl branching side chain such as 2,2-dimethyl-1,3-propanediol, 2-ethyl-2-butyl-1,3-propanediol, 2,2-diethyl-1,3-propanediol, a chain-extending agent such as an aliphatic diol having a branching alkyl side chain with three or more carbon atoms, such as 2-ethyl-2-butyl-1,3-propanediol, 2,2-diethyl-1,3-propanediol, and an organic diisocyanate, as well as introducing a hydrophilic polar group; and a polyurethane resin prepared by reacting a cyclic structure such as a dimer diol, a polyol compound having a long alkyl chain, and an organic diisocyanate, as well as introducing a hydrophilic polar group.

The average molecular weight of the polyurethane resin comprising a polar group that is employed in the present invention desirably ranges from 5,000 to 100,000, preferably from 10,000 to 50,000. An average molecular weight of equal to or greater than 5,000 is desirable in that it yields a magnetic coating that does not undergo a decrease in physical strength, such as by becoming brittle, and that does not affect the durability of the magnetic recording medium. A molecular weight of equal to or less than 100,000 may not reduce solubility in solvent and thus afford good dispersion. Further, since the coating material viscosity may not become high at defined concentrations, manufacturing properties can be good and handling can be facilitated.

Examples of the polar group comprised in the above-described polyurethane resins are: —COOM, —$SO_3M$, —$OSO_3M$, —P=O(OM)$_2$, —O—P=O(OM)$_2$ (where M denotes a hydrogen atom or alkali metal base), —OH, —NR$_2$, —N$^+$R$_3$ (where R denotes a hydrocarbon group), epoxy group, —SH, and —CN. At least one of these polar groups may be incorporated by copolymerization or an addition reaction for use. When the polar group-comprising polyurethane resin contains an OH group, a branched OH group is desirable from the perspectives of curing properties and durability. The branched OH group number of 2 to 40 is desirably per molecule, with the presence of 3 to 20 per molecule being preferred. The quantity of such polar groups ranges from, for example, $10^{-1}$ to $10^{-8}$ mol/g, preferably from $10^{-2}$ to $10^{-6}$ mol/g.

Specific examples of binders are VAGH, VYHH, VMCH, VAGF, VAGD, VROH, VYES, VYNC, VMCC, XYHL, XYSG; PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Bumock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The quantity of binder employed in the magnetic layer desirably falls within a range of, for example, 5 to 50 weight percent, preferably within a range of 10 to 30 weight percent, of the ferromagnetic powder (ferromagnetic magnetic powder or ferromagnetic hexagonal ferrite powder). In the case of a polyurethane resin, it is desirably employed in a quantity of 2 to 20 weight percent, and in the case of polyisocyanate, it is desirably employed in a quantity of 2 to 20 weight percent. It is desirable to employ them together. However, for example, when head corrosion occurs due to the release of trace amount of chlorine, it is possible to employ just polyurethane or polyurethane and isocyanate. When another resin in the form of vinyl chloride resin is employed, the desirable range is 5 to 30 weight percent. When employing polyurethane in the present invention, the glass transition temperature preferably ranges from −50 to 150° C., more preferably from 0 to 100° C. The elongation at break desirably ranges from 100 to 2,000 percent, the stress at break from 0.49 to 98 MPa, and the yield point from 0.49 to 98 MPa.

The magnetic recording medium comprises a nonmagnetic layer and at least one magnetic layer. Accordingly, the quantity of binder; the proportion of vinyl chloride resin, polyurethane resin, polyisocyanate, or some other resin in the binder; the molecular weight and quantity of polar groups in the various resins in the magnetic layer; and the physical characteristics of the above-described resins may be varied as needed from the nonmagnetic layer to the individual magnetic layers. They should be optimized for each layer. Known techniques for a multilayered magnetic layer may be applied. For example, when varying the quantity of binder in each layer, the quantity of binder in the magnetic layer may be increased to effectively reduce rubbing damage to the magnetic layer surface, and the quantity of binder in the nonmagnetic layer may be increased to impart flexibility for good head touch.

Examples of polyisocyanates suitable for use in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co. Ltd. They can be used singly or in combinations of two or more in each of layers by exploiting differences in curing reactivity.

V. Other Additives

Additives may be added to the magnetic layer and nonmagnetic layer as needed. Examples of such additives are: abrasives, lubricants, dispersing agents, antifungal agents, antistatic agents, oxidation inhibitors, solvents, and carbon black.

Examples are molybdenum disulfide; tungsten disulfide; graphite; boron nitride; graphite fluoride; silicone oils; silicones having a polar group; fatty acid-modified silicones; fluorine-containing silicones; fluorine-containing alcohols; fluorine-containing esters; polyolefins; polyglycols; polyphenyl ethers; aromatic ring-containing organic phosphorous acids such as phenylphosphorous acid and their alkali metal salts; alkylphosphorous acids such as octylphosphorous acid and their alkali metal salt; aromatic phosphoric acid esters such as phenylphosphate and their alkali metal salts; alkylphosphoric acid esters such as octylphosphate and their alkali metal salt; alkylsulfonic acid esters and their alkali metal salts; fluorine-containing alkylsulfuric acid esters and their alkali metal salts; monobasic fatty acids with 10 to 24 carbon atoms (which may contain an unsaturated bond or be branched) such as lauric acid and their alkali metal salts; monofatty esters, difatty esters, or polyfatty esters such as butyl stearate comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 22 carbon atoms (which may contain an unsaturated bond or be branched); alkoxy alcohols having 12 to 22 carbon atoms (which may contain an unsaturated bond or be branched) and monoalkyl ethers of alkylene oxide polymers; fatty acid amides comprising 2 to 22 carbon atoms, and fatty acid amines comprising 8 to 22 carbon atoms. Compounds comprising alkyl groups, aryl groups, and aralkyl groups substituted with groups other than the above-mentioned hydrocarbon groups such as nitro groups or hydrocarbon groups containing halogens such as F, Cl, Br, $CF_3$, $CCl_3$, and $CBr_3$ may also be employed. Further, nonionic surfactants such as alkylene oxid-based one, glycerine-based one, glycidol-based one and alkyl phenol ethylene oxide adducts; cationic surfactants such as cyclic amines, ester amides, quaternary ammonium salts, hydantoin derivatives, heterocycles, phosphoniums, and sulfoniums; anionic surfactants such as carboxylic acids, sulfonic acids, sulfuric esters, and other acid group-comprising compounds; and amphoteric surfactants such as amino acids, aminosulfonic acids, sulfuric and phosphoric acid esters of aminoalcohols, and alkyl betaines may also be employed.

These surfactants are described in detail in, "A Handbook of Surfactants" (published by Sangyo Tosho K.K.), which is expressly incorporated herein by reference in its entirety. These additives need not necessarily be pure, and may comprise isomers, unreacted products, side-products, decomposition products, oxides, and other impurities in addition to the principal components. The impurities desirably constitute equal to or less than 30 weight percent, preferably equal to or less than 10 weight percent. Specific examples of these additives are: NAA-102, hydrogenated castor oil fatty acid, NAA-42, Cation SA, Nymeen L-201, Nonion E-208, Anon BF and Anon LG manufactured by NOF Corporation; FAL-205 and FAL-123 manufactured by Takemoto Oil & Fat Co., Ltd.; NJLUB OL manufactured by New Japan Chemical Co.Ltd.; TA-3 manufactured by Shin-Etsu Chemical Co.Ltd.; Amride P manufactured by Lion Armour Co.,Ltd.; Duomine TDO manufactured by Lion Corporation; BA-41G manufactured by Nisshin Oil Mills, Ltd.; and Profan 2012E, Newpole PE61 and Ionet MS-400 manufactured by Sanyo Chemical Industries, Ltd.

Carbon black may be admixed to the magnetic layer and nonmagnetic layer to decrease surface resistivity and achieve the desired micro Vicker's hardness. The micro Vicker's hardness normally ranges from 25 to 60 kg/mm$^2$, and preferably from 30 to 50 kg/mm to adjust head touch. It can be measured with a thin-film hardness meter (the HMA-400 manufactured by NEC Corporation) using a triangular diamond indenter tip with a front end radius of 0.1 micrometer and an edge angle of 80 degrees. Examples of carbon blacks suitable for use in the magnetic layer and the nonmagnetic layer are furnace black for rubber, thermal for rubber, black for coloring, and acetylene black.

As for the carbon black, the specific surface area desirably ranges from 5 to 500 m$^2$/g, the DBP oil absorption capacity from 10 to 400 mL/100 g, the particle diameter from 5 to 100 nm, the pH from 2 to 10, the moisture content from 0.1 to 10 percent, and the tap density from 0.1 to 1 g/mL. Specific examples of types of carbon black suitable for use in the nonmagnetic layer are: BLACK PEARLS 2000, 1300, 1000, 900, 905, 800, 700 and VULCAN XC-72 from Cabot Corporation; #80, #60, #55, #50 and #35 from Asahi Carbon Co., Ltd.; #3050B, #3150B, #3250B, #3750B, #3950B, #2400B, #2300, #1000, #970B, #950, #900, #850B, #650B, #30, #40, #10B and MA-600 from Mitsubishi Chemical Corporation; CONDUCTEX SC, RAVEN 8800, 8000, 7000, 5750, 5250, 3500, 2100, 2000, 1800, 1500, 1255, 1250, 150, 50, 40, 15 and RAVEN-MT-P from Columbia Carbon Co., Ltd.; and Ketjen Black EC from Lion Akzo Co., Ltd.

The carbon black employed can be surface treated with a dispersing agent or the like, grafted with a resin, or a portion of the surface may be graphite-treated. Further, the carbon black may be dispersed with a binder prior to being added to the magnetic or nonmagnetic coating material. These types of carbon black may be employed singly or in combination. When employing carbon black, the quantity preferably ranges from 0.1 to 30 weight percent with respect to the weight of the magnetic material. In the magnetic layer, carbon black can work to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the magnetic layer and the nonmagnetic layer based on the objective and the various characteristics stated above, such as particle size, oil absorption capacity, electrical conductivity, and pH, and be optimized for each layer. The *Carbon Black Handbook* compiled by the Carbon Black Association, , which is expressly incorporated herein by reference in its entirety, may be consulted for types of carbon black suitable for use in the magnetic layer.

In the present invention, known organic solvent can be employed. The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition be not less than the arithmetic mean value of the nonmagnetic layer solvent composition. To improve dispersion properties, a solvent having a somewhat strong polarity is desirable. It is desirable that solvents having a dielectric constant equal to or higher than 15 are comprised equal to or higher than 50 percent of the solvent composition. Further, the dissolution parameter is desirably 8 to 11.

The types and quantities of dispersing agents, lubricants, and surfactants employed in the magnetic layer may differ from those employed in the nonmagnetic layer. For example (the present invention not being limited to the embodiments given herein), a dispersing agent usually has the property of adsorbing or bonding by means of a polar group. In the magnetic layer, the dispersing agent adsorbs or bonds by means of the polar group primarily to the surface of the ferromagnetic powder, and in the nonmagnetic layer, primarily to the surface of the nonmagnetic powder. It is surmised that once an organic phosphorus compound has adsorbed or bonded, it tends not to dislodge readily from the surface of a metal, metal compound, or the like. Accordingly, the surface of a ferromagnetic powder (ferromagnetic metal powder and ferromagnetic hexagonal ferrite powder) or the surface of a nonmagnetic powder becomes covered with the alkyl group, aromatic groups, and the like. This enhances the compatibility of the ferromagnetic powder or nonmagnetic powder with the binder resin component, further improving the dispersion stability of the ferromagnetic powder or nonmagnetic powder. Further, lubricants are normally present in a free state. Thus, it is conceivable to use fatty acids with different melting points in the nonmagnetic layer and magnetic layer to control seepage onto the surface, employ esters with different boiling points and polarity to control seepage onto the surface, regulate the quantity of the surfactant to enhance coating stability, and employ a large quantity of lubricant in the nonmagnetic layer to enhance the lubricating effect. All or some part of the additives employed in the present invention can be added in any of the steps during the manufacturing of coating liquids for the magnetic layer and nonmagnetic layer. For example, there are cases where they are mixed with the ferromagnetic powder prior to the kneading step; cases where they are added during the step in which the ferromagnetic powder, binder, and solvent are kneaded; cases where they are added during the dispersion step; cases where they are added after dispersion; and cases where they are added directly before coating.

VI. Backcoat Layer and Adhesion-Enhancing Layer

Generally, greater repeat running properties are demanded of magnetic tapes employed in computer data recording than of audio and video tapes. To maintain such high running durability, a backcoat layer can be provided on the opposite side of the nonmagnetic support from the side on which the nonmagnetic layer and magnetic layer are provided. The backcoat layer coating liquid can be prepared by dispersing the binder and granular components such as abrasives and antistatic agents in an organic solvent. Various inorganic pigments and carbon black may be employed as granular components. Nitrocellulose, phenoxy resin, vinyl chloride resin, polyurethane, and other resins may be employed singly or in combination as the binder.

An adhesion-enhancing layer can be provided on the surface of the nonmagnetic support to enhance the adhesion. For example, the following solvent-soluble compounds may be employed to the adhesion-enhancing layer: polyester resin, polyamide resin, polyamidoimide resin, polyurethane resin, vinyl chloride resin, vinylidene chloride resin, phenol resin, epoxy resin, urea resin, melamine resin, formaldehyde resin, silicone resin, starch, modified starch compounds, alginic acid compounds, casein, gelatin, pullulan, dextran, chitin, chitosan, rubber latex, gum Arabic, fimori, natural gum, dextrin, modified cellulose resin, polyvinyl alcohol resin, polyethylene oxide, polyacrylic acid-based resin, polyvinyl pyrrolidone, polyethyleneimine, polyvinyl ether, polymaleic acid copolymers, polyacrylamide, and alkyd resins.

The adhesion-enhancing layer desirably ranges from 0.01 to 3.0 micrometers, preferably from 0.02 to 2.0 micrometers, more preferably 0.05 to 1.5 micrometers in thickness. The glass transition temperature of the resin employed in the adhesion-enhancing layer is desirably from 30 to 120° C., preferably from 40 to 80° C. At equal to or greater than 30° C., blocking may not occur on the two end surfaces, and at equal to or less than 120° C., internal stress in the adhesive-enhancing layer can be alleviated and good adhesive strength achieved.

VII. Layer Structure

In the magnetic recording medium of the present invention, a coating layer comprising a magnetic layer and a nonmagnetic layer is provided on at least one surface of a nonmagnetic support. The magnetic layer may be comprised of two or more layers when necessary. A backcoat layer may be provided as needed on the opposite surface of the nonmagnetic support. Further, various coatings such as lubricant coatings and magnetic layer protecting coatings may be provided as needed on the magnetic layer. An undercoating layer (adhesion-enhancing layer) may be provided between the nonmagnetic support and the nonmagnetic layer in order to increase adhesion between the coating layer and the nonmagnetic support.

In the magnetic recording medium of the present invention, it suffices for the nonmagnetic layer and magnetic layer to be present on one surface of the nonmagnetic support, but they can be provided on both surfaces. When coating the nonmagnetic layer (lower layer) and magnetic layer (upper layer), the lower layer can be coated first, and the upper layer (magnetic layer) provided while the lower layer is still wet or once it has dried. From the perspective of productivity, simultaneous or successive wet coating is desirable. However, for disks, coatings coated after drying are adequately serviceable. In simultaneous and successive wet coatings in the multilayered structure of the present invention, since the upper layer and lower layer can be simultaneously formed, a surface processing step such as a calendering step can be put to effective use, and the surface roughness of the upper layer magnetic layer can be improved, even when it is an ultra-thin layer.

The thickness of the nonmagnetic support desirably ranges from 3 to 80 micrometers. In computer tapes, a nonmagnetic support having a thickness of 3.5 to 7.5 micrometers, preferably from 3 to 7 micrometers, can be employed. Further, when providing an undercoating layer between the nonmagnetic support and the nonmagnetic layer, the thickness of the undercoating layer is desirably from 0.01 to 0.8 micrometer, preferably from 0.02 to 0.6 micrometer. Further, when providing a backcoat layer on the opposite side from the side on which the nonmagnetic layer and the magnetic layer is provided on the nonmagnetic support, the thickness thereof is, for example, from 0.1 to 1.0 micrometer, preferably from 0.2 to 0.8 micrometer.

The thickness of the magnetic layer is optimized based on the saturation magnetization level and head gap length of the magnetic head employed and the recording signal band, but is generally from 10 to 100 nm, preferably from 20 to 80 nm, and more preferably from 30 to 80 nm. Further, the thickness fluctuation rate of the magnetic layer is desirably within ±50 percent, preferably within ±40 percent. The magnetic layer comprises at least one layer, but may be separated into two or more layers having different magnetic characteristics. Known multilayer magnetic layer configurations may be employed.

The thickness of the nonmagnetic layer is, for example, 0.02 to 3.0 micrometers, preferably from 0.05 to 2.5 micrometers, and more preferably, from 0.1 to 2.0 micrometers. When the magnetic recording medium of the present invention has a nonmagnetic layer, the nonmagnetic layer can effectively function so long as it is essentially nonmagnetic. For example, even when an impurity or an intentional trace amount of magnetic material is contained, the effect of the present invention is exhibited and the configuration can be seen as being essentially identical to that of the magnetic recording medium of the present invention. The term "essentially identical" means that the residual magnetic flux density of the nonmagnetic layer is equal to or less than 10 T·m (100 G) or the coercive force is equal to or less than 7.96 kA/m (100 Oe), with the absence of a residual magnetic flux density and coercive force being preferred.

VIII. Physical Properties

The saturation magnetic flux density of the magnetic layer is desirably from 100 to 300 T·m. The coercivity (Hc) of the magnetic layer is desirably from 143.3 to 318.4 kA/m, preferably from 159.2 to 278.6 kA/m. The coercivity distribution is desirably narrow, with the SFD and SFDr being equal to or less than 0.6, preferably equal to or less than 0.2.

The coefficient of friction of the magnetic recording medium of the present invention with the head is desirably equal to or less than 0.5, preferably equal to or less than 0.3, over a temperature range of −10 to 40° C. and a humidity range of 0 to 95 percent. Specific surface resistivity is from $10^4$ to $10^{12}$ Ω/sq on the magnetic surface, and the charge potential is desirably within a range of −500 to +500 V. The modulus of elasticity at 0.5 percent elongation of the magnetic layer is desirable from 0.98 to 19.6 GPa in all in-plane directions. The breaking strength is desirably from 98 to 686 MPa. The modulus of elasticity of the magnetic recording medium is desirably from 0.98 to 14.7 GPa in all in-plane directions. The residual elongation is desirably equal to or less than 0.5 percent. The thermal shrinkage rate at any temperature equal to or less than 100° C. is desirably equal to or less than 1 percent, preferably equal to or less than 0.5 percent, and more preferably equal to or less than 0.1 percent.

The glass transition temperature of the coating layer comprising a magnetic layer and a nonmagnetic layer is as set forth above. The glass transition temperature of the magnetic layer (the peak loss elastic modulus of dynamic viscoelasticity measured at 110 Hz) is desirably from 50 to 180° C., and that of the nonmagnetic layer is desirably from 0 to 180° C. The loss elastic modulus desirably falls within a range of $1\times10^7$ to $8\times10^8$ Pa and the loss tangent is desirably equal to or less than 0.2. Excessive high loss tangent tends to cause a adhesion failure. These thermal and mechanical characteristics are desirably identical to within 10 percent in all in-plane directions of the medium.

The residual solvent contained in the magnetic layer is desirably equal to or less than 100 mg/m$^2$, preferably equal to or less than 10 mg/m$^2$. The void rate of the coated layer is desirably equal to or less than 30 volume percent, preferably equal to or less than 20 volume percent, in both the nonmagnetic and magnetic layers. A low void rate is desirable to achieve high output, but there are objectives for which ensuring a certain value is good. For example, in disk media in which repeat applications are important, a high void rate is often desirable for running durability.

The maximum height SR$_{max}$ of the magnetic layer is desirably -equal to or less than 0.5 micrometer. The ten-point average roughness SRz is desirably equal to or less than 0.3 micrometer. The center surface peak SRp is desirably equal to or less than 0.3 micrometer. The center surface valley depth SRv is desirably equal to or less than 0.3 micrometer. The center surface surface area SSr is desirably from 20 to 80 percent. And the average wavelength S$\lambda$a is desirably from 5 to 300 micrometers. These can be readily controlled by controlling the surface properties by means of fillers employed in the support and the surface shape of the rolls employed in calendering. Curling is desirably within ±3 mm.

It is possible to vary the physical characteristics between the nonmagnetic layer and the magnetic layer based on the objective. For example, while increasing the modulus of elasticity of the magnetic layer to improve running durability, it is possible to make the modulus of elasticity of the nonmagnetic layer lower than that of the magnetic layer to enhance contact between the magnetic recording medium and the head.

Method of Manufacturing Magnetic Recording Medium

The present invention further relates to a method of manufacturing a magnetic recording medium, wherein the magnetic recording medium comprises a coating layer on a nonmagnetic support, the coating layer comprises a nonmagnetic layer comprising a nonmagnetic powder and a binder and a magnetic layer comprising a ferromagnetic powder and a binder in this order, the nonmagnetic support comprises a main component in the form of a resin obtained by mixing and/or copolymerizing a polyester and a polymer having compatibility with the polyester, has a glass transition temperature of equal to or higher than 80° C. but less than 125° C.; and the method comprising subjecting the magnetic recording medium following forming the coating layer to heat treatment to adjust a heat absorption peak of the nonmagnetic support, based on enthalpy relaxation, within a range of 0.5 to 2.0 J/g.

Details of the nonmagnetic support and the heat treatment for the adjustment of enthalpy relaxation in the method of manufacturing a magnetic recording medium of the present invention are as set forth above. By the method, the magnetic recording medium of the present invention can be manufactured.

Specific embodiments of the method of manufacturing a magnetic recording medium of the present invention will be described below. However, the present invention is not limited to the following embodiments.

The process of manufacturing the magnetic layer coating liquid and nonmagnetic layer coating liquid comprises at least a kneading step, dispersion step, and mixing steps provided as needed before and after these steps. Each of the steps may be divided into two or more stages. All of the starting materials employed in the present invention, including the ferromagnetic hexagonal ferrite powder or ferromagnetic metal powder, nomnagnetic powder, binder, carbon black, abrasives, antistatic agents, lubricants, and solvents may be added at the beginning or during any step. Further, each of the starting materials may be divided and added during two or more steps. For example, polyurethane may be divided up and added during the kneading step, dispersion step, and mixing step for viscosity adjustment following dispersion. To achieve the object of the present invention, conventionally known manufacturing techniques may be employed for some of the steps. A kneading device of high kneading strength such as an open kneader, continuous kneader, pressure kneader, or extruder is desirably employed in the kneading step. When a kneader is employed, all or a portion (with equal to or greater than 30 percent of the total binder being desirable) of the magnetic powder or nonmagnetic powder and binder can be kneaded in a proportion of 15 to 500 weight parts by weight per 100 weight parts by weight of magnetic material. The details of the kneading process are described in detail in Japanese Unexamined Patent Publication (KOKAI) Heisei Nos. 1-106338 and 1-79274. The contents of these applications are expressly incorporated herein by reference in their entirety. Further, glass beads may be employed to disperse the magnetic layer coating liquid and nonmagnetic coating liquid. A dispersion medium having a high specific gravity such as zirconia beads, titania beads, or steel beads is suitable for use as the glass beads. The particles diameter and fill rate of the dispersion medium are optimized for use. A known dispersing machine may be employed.

In the method of manufacturing the magnetic recording medium of the present invention, the magnetic layer coating liquid can be coated to a prescribed film thickness on the surface of the nonmagnetic support while running to form a magnetic layer. In this process, multiple magnetic layer coating liquids can be sequentially or simultaneously multilayer coated, and the nonmagnetic layer coating liquid and magnetic layer coating liquid can be sequentially or simultaneously multilayer coated. Coating machines suitable for use in coating the magnetic and nonmagnetic coating materials mentioned above are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K.K. may be referred to in this regard, which is expressly incorporated herein by reference in its entirety.

In the case of a magnetic tape, the layer formed by coating the magnetic layer coating liquid can be magnetically oriented in the longitudinal direction using a cobalt magnet or solenoid on the ferromagnetic powder contained in the layer formed by coating the magnetic layer coating liquid. In the case of a disk, although isotropic orientation can be adequately achieved without orientation using an orientation device, the positioning of cobalt magnets at mutually oblique angles or the use of a known random orientation device such as the application of an alternating current magnetic field with solenoids is desirably employed. In the case of ferromagnetic metal powder, the term "isotropic orientation" generally desirably means two-dimensional in-plane randomness, but can also mean three-dimensional randomness when a vertical component is imparted. In the case of hexagonal ferrite, three-dimensional randomness in the in-plane and vertical directions is generally readily achieved, but two-dimensional in-plane randomness is also possible. A known method such as magnets with opposite poles opposed may be employed to impart isotropic magnetic characteristics in a circumferential direction using a vertical orientation. Vertical orientation is particularly desirable in the case of high-density recording. Further, spin coating may be employed to achieve circumferential orientation.

The temperature and flow rate of drying air and the coating rate are desirably determined to control the drying position of the coated film. The coating rate is desirably from 20 m/min to 1,000 m/min and the temperature of the drying air is desirably equal to or greater than 60° C. It is also possible to conduct suitable predrying before entry into the magnet zone.

Following drying, a surface smoothing treatment can be applied to the coating layer. For example, supercalender rolls can be employed in the surface smoothing treatment. The surface smoothing treatment can eliminate holes produced by the removal of solvent during drying and improve the fill rate of ferromagnetic powder in the magnetic layer, making it possible to obtain a magnetic recording medium of high electromagnetic characteristics. Heat-resistant plastic rolls such as epoxy, polyimide, polyamide, and polyamidoimide rolls may be employed as the calendering rolls. Processing with metal rolls is also possible. The magnetic recording medium of the present invention desirably has an extremely smooth surface. For example, this is achieved by subjecting a magnetic layer formed by selecting a ferromagnetic powder and binder such as have been set forth above to the above-described calendering. Calendering is desirably conducted under conditions of a calendering roll temperature falling within a range of 60 to 100° C., preferably within a range of 70 to 100° C., and more preferably within a range of 80 to 100° C., at a pressure falling within a range of 98 to 490 kN/m, preferably within a range of 196 to 441 kN/m, and more preferably within a range of 294 to 392 kN/m.

Means of lowering the thermal shrinkage rate include the method of heat treating a web while handling it with low tension, and methods of heat treatment (thermotreatment methods) with the tape disposed in layers, such as in bulk or installed in a cassette. Either can be used. From the perspective of achieving a magnetic recording medium of high output and low noise, a thermotreatment method is desirable.

The magnetic recording medium obtained can be cut to desired size in a cutter or the like for use.

FIG. 1 shows manufacturing process 10 descriptive of the method of manufacturing the magnetic recording medium of the present invention. The above-described nonmagnetic support film (referred to as the "film" hereinafter) 11 is employed as the above-described nonmagnetic support. Coating step 12 is conducted to coat the various coating liquids and sequentially form a nonmagnetic layer and a magnetic layer on film 11. In coating step 12, the nonmagnetic layer coating liquid and magnetic layer coating liquid can be coated either simultaneously or in succession.

From the perspective of ease of orientation, magnetic field orientation step 13 is desirably conducted while the coating liquid is wet. The magnetic field desirably falls within a range of equal to or higher than 0.1 T·m and equal to or lower than 1.0 T·m. Drying step 14 is conducted to dry the various coating liquids. Subsequently, film 11 on which the various layers have been formed is subjected to calendering in calendering step 15. Subsequently, a stock material of the magnetic recording medium that has been rolled up is subjected to heat relaxation step 16. In heat relaxation step 16, as set forth above, the temperature is adjusted to a temperature lower than the glass transition temperature of the film. The duration of heat relaxation is desirably equal to or more than one hour and equal to or less than 14 days, as set forth above. Subsequently, the stock material of the magnetic recording material is desirably slit to obtain magnetic tape 17. Conducting calendering step 15 can yield a magnetic tape 17 with a smooth surface.

Not all of individual steps 12 to 17 in manufacturing process 10 of the present invention are always necessary; they may be suitably omitted. Further, other steps may be conducted. For example, to enhance handling of magnetic tape 17, in any one of the above-described steps, a backcoat layer is desirably provided on the opposite side of film 11 from the side on which the magnetic layer and the like are formed.

As set forth above, the present invention can prevent sticking due to adhesion in the course of the heat treatment in a rolled-up state. However, there is no limitation to a form in which heat relaxation step 16 in the present invention is conducted after the formation of all the layers. Heat relaxation step 16 can be conducted after the formation of at least one from among the nonmagnetic layer, magnetic layer, and backcoat layer.

Figure 2:
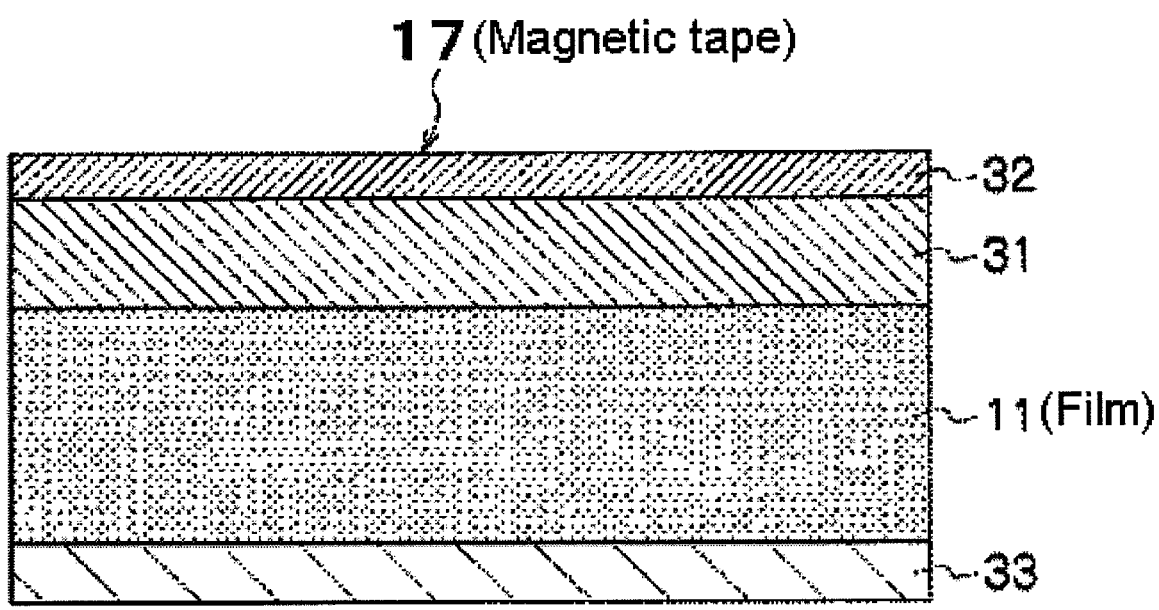
FIG. 2 is a schematic sectional view of an example of the magnetic recording medium of the present invention.

FIG. 2 is a schematic sectional view of magnetic tape 17 in an example of the magnetic recording medium of the present invention. Nonmagnetic layer 31 and magnetic layer 32 have been formed on one surface of film 11 that has been subjected to heat relaxation treatment. Backcoat layer 33 has been formed on the opposite side of film 11 from the side on which layers 31 and 32 have been formed.

EXAMPLES

The present invention will be described in detail below based on examples. However, the present invention is not limited to the examples. The term "parts" given in Examples are weight parts unless specifically stated otherwise.

Examples of preparing the film employed as the nonmagnetic support in the Examples and comparative examples are given below. The abbreviations employed have the following meanings:

| | |
|---|---|
| PEN: | Polyethylene-2,6-naphthalate |
| NDCA: | 2,6-Naphthalenedicarboxylic acid |
| PPG: | Propylene glycol |
| NDCA-PPG: | Polyester comprised of 2,6-naphthalenedicarboxylic acid and propylene glycol |
| HNCA: | 6-Hydroxy-2-naphthoic acid |

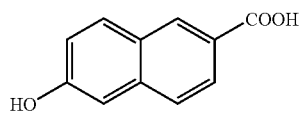

| | |
|---|---|
| PHBA: | Parahydroxybenzoic acid |

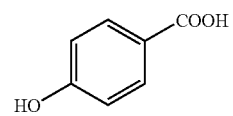

| | |
|---|---|
| HNCA + PHBA: | Polyester comprised of 6-hydroxy-2-naphthoic acid and parahydroxybenzoic acid |
| PHBC: | 4'-Hydroxybiphenyl-4-carboxylic acid |

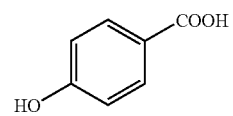

| | |
|---|---|
| HNCA + PHBC: | Polyester comprised of 6-hydroxy-2-naphthoic acid and 4'-hydroxybiphenyl-4-carboxylic acid |

Preparation Example 1

Synthesis of polyethylene naphthalate (PEN)

Charging was conducted at a ratio of 1.6 mols of ethylene glycol per mol of naphthalenedicarboxylic acid (NDCA) and the mixture was reacted for 2 hours at 260° C. to produce an oligomer comprised chiefly of bishydroxyethyl naphthalate. Subsequently, 120 ppm of a catalyst in the form of antimony trioxide was added based on the number of mols of naphthalenedicarboxylic acid and the mixture was reacted for 4 hours at 280° C. under reduced pressure. Strands of molten polymer were extruded from the outlet, cooled, and cut to obtain PEN pellets.

Synthesis of polypropylene naphthalate (NDCA-PPG)

NDCA-PPG pellets of polypropylene naphthalate were obtained using propylene glycol (PPG) instead of ethylene glycol by the same method as for PEN above.

Ninety parts of the PEN pellets and 10 parts of the NDCA-PPG pellets thus obtained were dried for 10 hours at 80° C., charged to an extruder, and melted by heating to 275° C. The mixture was then extruded in sheet form through the orifice of a T-die, wound onto a cooling drum with a surface temperature of 10° C., and cooled to prepare an undrawn film 70 micrometers in thickness. Next, the undrawn film was longitudinally roll-drawn 3.3-fold at a drawing temperature of 90° C., drawn 4.2-fold in the width direction in a tenter, and heat treated at 230° C. at a relaxation rate of 5 percent to obtain a film 5 micrometers thick.

Preparation Examples 2 to 4

The blending ratio of the PEN pellets and NDCA-PPG pellets in Preparation Example 1 were varied as shown in Table 1 to obtain the films employed in Examplets 2 to4.

Preparation Example 5

Polyester (HNCA+PHBA) comprised of 6-hydroxy-2-naphthoic acid and parahydroxybenzoic acid Charging was conducted at a ratio of 0.6 mol of parahydroxybenzoic acid (PHBA) per mol of 6-hydroxy-2-naphthoic acid (HNCA), 110 ppm of a catalyst in the form of antimony trioxide was added based on the number of mols of HNCA, and the mixture was reacted for 4 hours at 300° C. under reduced pressure. Strands of molten polymer were extruded from the outlet, cooled, and cut to obtain HNCA+PHBA pellets.

The NDCA-PPG pellets of Preparation Example 1 were replaced with HNCA+PHBA pellets and the blending ratio with PEN pellets was changed as indicated in Table 1 to obtain the film employed in Example 5.

Preparation Example 6

Polyester (HNCA+PHBC) comprised of 6-hydroxy-2-naphthoic acid and 4'-hydroxybiphenyl-4-carboxylic acid Charging was conducted at a ratio of 0.6 mol of 4'-hydroxybiphenyl-4-carboxylic acid (PHBC) per mol of 6-hydroxy-2-naphthoic acid (HNCA), 100 ppm of a catalyst in the form of antimony trioxide was added based on the number of mols of HNCA, and the mixture was reacted for 4 hours at 310° C. under reduced pressure. Strands of molten polymer were extruded from the outlet, cooled, and cut to obtain HNCA+PHBC pellets.

The HNCA+PHBA pellets of Preparation Example 5 were replaced with the HNCA+PHBC pellets thus obtained and the blending ratio with PEN pellets was changed as indicated in Table 1 to obtain the film employed in Example 6.

Example 1

Preparation of Magnetic Layer Coating Liquid

| | |
|---|---|
| Ferromagnetic plate-shaped hexagonal ferrite powder<br>Composition (molar ratio): Ba/Fe/Co/Zn = 1/11/0.2/0.8<br>Coercivity (Hc): 207 kA/m (approximately 2800 Oe)<br>Plate diameter: 25 nm<br>Plate ratio: 3<br>Specific surface area by BET method: 48 $m^2/g$<br>Saturation magnetization($\sigma s$): 58 A · m2/kg<br>(approximately 58 emu/g) | 100 parts |
| Polyurethane resin<br>Branched side chain-containing polyester polyol/<br>diphenylmethane diisocyanate type, Hydrophilic polar<br>group: —$SO_3Na$ content is 70 eq/ton. | 12 parts |
| Phenylphosphorous acid | 3 parts |
| $\alpha$-$Al_2O_3$ (particle size: 0.15 micrometer) | 2 parts |
| Carbon black (particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

Preparation of Nonmagnetic Layer Coating Liquid

| | |
|---|---|
| Inorganic nonmagnetic powder<br>$\alpha$-iron oxide<br>Surface treatment agent: $Al_2O_3$, $SiO_2$<br>Major axis diameter: 0.15 micrometer<br>Tap density: 0.8 g/ml<br>Acicular ratio: 7<br>Specific surface area by BET method: 52 $m^2/g$<br>pH: 8<br>DBP oil absorption capacity: 33 g/100 g | 80 parts |
| Carbon black<br>DBP oil absorption capacity: 120 ml/100 g<br>pH: 8<br>Specific surface area by BET method: 250 $m^2/g$<br>Volatile content: 1.5 percent | 20 parts |
| Polyurethane resin<br>Branched side chain-containing polyester<br>polyol/diphenylmethane diisocyanate type, Hydrophilic<br>polar group: —$SO_3Na$ content is 70 eq/ton. | 12 parts |
| Vinyl chloride resin<br>Hydrophilic polar group: —$SO_3Na$ content is 60 eq/ton. | 6 parts |
| Phenylphosphorous acid | 3 parts |
| $\alpha$-$Al_2O_3$ (average particle diemeter:<br>0.2 micrometer) | 1 parts |
| Cyclohexanone | 140 parts |
| Methyl ethyl ketone | 170 parts |
| Butyl stearate | 2 parts |
| Stearic acid | 1 part |

The various components of the composition of the magnetic layer coating liquid and the composition of the nonmagnetic layer coating liquid were separately kneaded for 60 minutes in an open kneader and dispersed for 120 minutes in a sand mill. To the dispersions obtained were added 6 parts of a trifunctional low-molecular-weight polyisocyanate compound (Coronate 3041 made by Nippon Polyurethane Industry Co.), and the mixtures were stirred for another 20 minutes. The mixtures were filtered with a filter having an average pore size of 1 micrometer to prepare a magnetic layer coating liquid and a nonmagnetic layer coating liquid. The nonmagnetic layer coating liquid was coated in a quantity calculated to yield a dry thickness of 1.0 micrometer, and immediately thereafter, the magnetic layer coating liquid was coated in a quantity calculated to yield a dry thickness of 0.1 micrometer in a simultaneous multilayer coating on the film support prepared in Preparation Example 1. While the two layers were still wet, magnetic field orientation was conducted with 300 T·m (3,000 Gauss) magnets. Following drying, a surface smoothing treatment was conducted with a seven-stage calender comprised of just metal rolls at a rate of 120 m/min, a linear pressure of 300 kg/cm, and a temperature of 90° C. Subsequently, a heat treatment (heat relaxation treatment) was conducted at the temperature and for the duration indicated in Table 1 and the product was slit to a ½ inch width to produce a magnetic tape.

Examples 2 to 6

Magnetic tapes were manufactured by the same method as in Example 1, with the exceptions that the nonmagnetic support was changed as indicated in Table 1, the heat treatment was conducted at the temperature and for the duration indicated in Table 1, and the quantities of polyurethane resin, vinyl chloride resin, and curing agent (polyisocyanate compound) in the nonmagnetic layer coating liquid were varied as indicated in Table 2.

Comparative Examples 1 and 2

Magnetic tapes were manufactured by the same method as in Example 1 with the exceptions that the nonmagnetic support was changed as indicated in Table 1, the heat treatment was conducted at the temperature and for the duration indicated in Table 1, and the quantities of polyurethane resin, vinyl chloride resin, and curing agent (polyiso-cyanate compound) in the nonmagnetic layer coating liquid were varied as indicated in Table 1.
Measurement Methods
1. Measurement of the Glass Transition Temperature and Amount of Enthalpy Relaxation (ΔH)

A Q100 temperature-modulation differential scanning calorimeter (TMDSC) made by TA Instruments was employed. The sample was uniformly introduced into an aluminum pan and clamped. The sample was placed in the sample chamber and measurement was conducted from room temperature to 300° C. at a rate of temperature increase of 5° C./min, a temperature modulation period of 30 s, and a temperature modulation amplitude of 0.5° C. The midpoint of the difference in level of the temperature-reverse heat flow curve obtained was adopted as the glass transition temperature (Tg), and the area of the peak in the vicinity of Tg on the temperature-nonreversible heat flow curve was calculated as the amount of enthalpy relaxation (ΔH). Measurement of the coating layer on the magnetic layer side was conducted by peeling away the coating layer from the support.
2. Roll Appearance and Measurement of the Adhesion Level Following the heat relaxation step, the appearance of the rolls that had been gradually cooled to room temperature was visually determined. Those in which lumps and the like appeared were evaluated as "Poor," those in which some unevenness was observed but not on a level that presented problems for use were evaluated as "Good," and those that were identical to before the heat treatment were evaluated as "Excellent." Those in which wrinkles and the like appeared in the rolls when they were unrolled as set forth further below were also evaluated as "Poor."

With regard to adhesion, rolls that unrolled without problem when the rolls were returned to unwound state at a rate of 200 m/min while applying a tension of 10 kgf/m to the rolls following the above-described gradual cooling were evaluated as "Excellent," those that produced some adhesion noise but not on a level that presented problems for use were evaluated as "Good," and those that broke were denoted as "Poor."
3. Measurement of the Amount of Creep Deformation A load of 1.0 N per ½ inch was applied to the tapes that were obtained and an LSM-503S laser scan micrometer made by Mitsutoyo was employed to measure the initial width in an environment of 20° C. and 20 percent RH. A load of 1.0 N per ½ inch was applied in an environment of 40° C. and 20 percent RH and the tapes were left standing for 10 days. After standing for 10 days, a load of 1.0 N per ½ inch was applied in an environment of 20° C. and 20 percent RH, the width was measured, and the change in width relative to the initial width was denoted in ppm.

The results are given in Table 1.

TABLE 1

| | Support | | | | |
|---|---|---|---|---|---|
| | Main polymer | Ratio (weight %) | Auxiliary polymer | Ratio (weight %) | Tg (° C.) |
| Example 1 | PEN | 90 | NDCA-PPG | 10 | 110 |
| Example 2 | PEN | 80 | NDCA-PPG | 20 | 100 |
| Example 3 | PEN | 70 | NDCA-PPG | 30 | 90 |
| Example 4 | PEN | 60 | NDCA-PPG | 40 | 80 |
| Example 5 | PEN | 70 | HNCA + PHBA | 30 | 120 |
| Example 6 | PEN | 70 | HNCA + PHBA | 30 | 115 |
| Comp. Ex. 1 | PEN | 100 | — | 0 | 127 |
| Comp. Ex. 2 | PEN | 100 | — | 0 | 127 |

| | Nonmagnetic layer | | | Tg of coating layer on the magnetic layer side (° C.) |
|---|---|---|---|---|
| | Urethane (parts) | Vinyl chloride resin (parts) | Curing agent (parts) | |
| Example 1 | 12 | 6 | 6 | 90 |
| Example 2 | 12 | 10 | 2 | 80 |
| Example 3 | 12 | 10 | 2 | 80 |

TABLE 1-continued

| | | | | |
|---|---|---|---|---|
| Example 4 | 18 | 6 | 2 | 75 |
| Example 5 | 12 | 10 | 2 | 80 |
| Example 6 | 12 | 10 | 2 | 80 |
| Comp. Ex. 1 | 12 | 10 | 2 | 80 |
| Comp. Ex. 2 | 18 | 6 | 2 | 70 |

| | Heat treatment | | | Amount of enthalpy relaxation (J/g) | Amount of creep deformation (ppm) |
|---|---|---|---|---|---|
| | Temp. (° C.) | Duration (hr.) | Adhesion level | Roll appearance | | |

| | Temp. (° C.) | Duration (hr.) | Adhesion level | Roll appearance | relaxation (J/g) | deformation (ppm) |
|---|---|---|---|---|---|---|
| Example 1 | 80 | 36 | Excellent | Good | 1.1 | 60 |
| Example 2 | 75 | 36 | Good | Excellent | 1.2 | 55 |
| Example 3 | 75 | 36 | Good | Excellent | 1.5 | 50 |
| Example 4 | 70 | 36 | Good | Excellent | 1.8 | 50 |
| Example 5 | 70 | 36 | Excellent | Excellent | 0.7 | 80 |
| Example 6 | 75 | 36 | Good | Excellent | 1.2 | 50 |
| Comp. Ex. 1 | 90 | 36 | Poor | Poor | 1.1 | 60 |
| Comp. Ex. 2 | 75 | 36 | Poor | Poor | 0.4 | 120 |

Evaluation Results

As shown in Table 1, the blending of an auxiliary polymer into PEN lowered the Tg of the PEN. The reduction of the Tg of the support made it possible to achieve a desired level of enthalpy relaxation even when the temperature in the heat relaxation step was lowered below the Tg of the coating layer, yielding a magnetic tape of high dimensional stability.

By contrast, supports in which PEN with a Tg of 127° C. were employed in Comparative Examples 1 and 2. Thus, in Comparative Example 1, in which the temperature at which the heat relaxation step was conducted was increased above the Tg of the coating layer to achieve enthalpy relaxation capable of yielding good dimensional stability, adhesion occurred and the appearance of the roll deteriorated. In Comparative Example 2, in which the heat treatment temperature was kept relatively low, adequate enthalpy relaxation was not achieved and dimensional stability deteriorated.

The magnetic recording medium of the present invention is suitable for use as a backup tape that is required to have high reliability for extended periods.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

What is claimed is:

1. A magnetic recording medium comprising a coating layer on a nonmagnetic support, wherein
the coating layer comprises a nonmagnetic layer comprising a nonmagnetic powder and a binder and a magnetic layer comprising a ferromagnetic powder and a binder in this order,
the nonmagnetic support comprises a main component in the form of a resin obtained by mixing and/or copolymerizing a polyethylene naphthalate and a polymer other than the polyethylene naphthalate, has a glass transition temperature of equal to or higher than 80° C. but less than 125° C., and has a heat absorption peak, based on enthalpy relaxation, ranging from 0.5 to 2.0 J/g, the resin having a glass transition temperature lower than the glass transition temperature of the polyethylene naphthalate, and the amount of the polyethylene naphthalate in the resin is from 60-90 wt % based on the total weight of the PEN and the other polymer.

2. The magnetic recording medium according to claim 1, wherein the coating layer has a glass transition temperature ranging from 70 to 95° C.

3. A method of manufacturing a magnetic recording medium, wherein the magnetic recording medium comprises a coating layer on a nonmagnetic support, the coating layer comprises a nonmagnetic layer comprising a nonmagnetic powder and a binder and a magnetic layer comprising a ferromagnetic powder and a binder in this order, the nonmagnetic support comprises a main component in the form of a resin obtained by mixing and/or copolymerizing a polyethylene naphthalate and a polymer other than the polyethylene naphthalate, has a glass transition temperature of equal to or higher than 80° C. but less than 125° C., and the amount of the polyethylene naphthalate in the resin is from 60-90 wt % based on the total weight of the PEN and the other polymer; and the method comprises subjecting the magnetic recording medium following forming the coating layer to heat treatment to adjust a heat absorption peak of the nonmagnetic support, based on enthalpy relaxation, within a range of 0.5 to 2.0 J/g, the resin having a glass transition temperature lower than the glass transition temperature of the polyethylene naphthalate, wherein polyethylene naphthalate is present in an amount of from 60-90 wt %.

4. The method of manufacturing a magnetic recording medium according to claim 3, wherein the heat treatment is conducted at a temperature 5 to 30° C. lower than a glass transition temperature of the coating layer.

5. The method of manufacturing a magnetic recording medium according to claim 4, wherein the coating layer has a glass transition temperature ranging from 70 to 95° C.

6. The magnetic recording medium according to claim 1, wherein the glass transition temperature of the nonmagnetic support is equal to or higher than 80° C. but equal to or less than 123° C.

7. The method of manufacturing a magnetic recording medium according to claim 3, wherein the glass transition temperature of the nonmagnetic support is equal to or higher than 80° C. but equal to or less than 123° C.

* * * * *